US007877448B2

(12) United States Patent
Janakiraman et al.

(10) Patent No.: US 7,877,448 B2
(45) Date of Patent: Jan. 25, 2011

(54) GRANULARLY SELECTING A SUBSET OF RECIPIENTS WHO CAN REPLY TO A SENDER'S E-MAIL

(75) Inventors: Janani Janakiraman, Austin, TX (US); Basu Vaidyanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 11/780,100

(22) Filed: Jul. 19, 2007

(65) Prior Publication Data

US 2009/0024706 A1     Jan. 22, 2009

(51) Int. Cl.
G06F 15/16     (2006.01)
(52) U.S. Cl. ........................... 709/206; 709/201
(58) Field of Classification Search ............ 709/206
See application file for complete search history.

(56) References Cited

U.S. PATENT DOCUMENTS

| | | | | |
|---|---|---|---|---|
| 5,325,310 | A * | 6/1994 | Johnson et al. | 709/206 |
| 5,872,925 | A * | 2/1999 | Han | 709/206 |
| 5,878,230 | A * | 3/1999 | Weber et al. | 709/238 |
| 5,883,901 | A * | 3/1999 | Chiu et al. | 370/508 |
| 5,966,351 | A * | 10/1999 | Carleton et al. | 369/29.01 |
| 6,016,478 | A * | 1/2000 | Zhang et al. | 705/9 |
| 6,351,764 | B1 * | 2/2002 | Voticky et al. | 709/207 |
| 6,442,250 | B1 * | 8/2002 | Troen-Krasnow et al. | 379/93.15 |
| 6,466,956 | B1 * | 10/2002 | Cho et al. | 715/205 |
| 6,496,853 | B1 * | 12/2002 | Klein | 709/206 |
| 6,618,748 | B1 * | 9/2003 | Bates et al. | 709/206 |
| 6,633,849 | B1 * | 10/2003 | Dodd | 705/1 |
| 6,721,402 | B2 * | 4/2004 | Usami | 379/93.24 |
| 6,769,067 | B1 * | 7/2004 | Soong | 726/2 |
| 6,810,408 | B1 * | 10/2004 | Bates et al. | 709/200 |
| 6,871,217 | B2 * | 3/2005 | Voticky et al. | 709/207 |
| 6,903,838 | B1 * | 6/2005 | Hanson et al. | 358/1.15 |
| 7,054,906 | B2 | 5/2006 | Levosky | |
| 7,283,810 | B1 * | 10/2007 | Arakawa et al. | 455/414.1 |
| 2003/0126216 | A1 * | 7/2003 | Avila et al. | 709/206 |
| 2003/0177189 | A1 | 9/2003 | Tomono | |
| 2004/0006599 | A1 | 1/2004 | Bates et al. | |
| 2006/0277263 | A1 * | 12/2006 | Daniels et al. | 709/206 |
| 2007/0005789 | A1 * | 1/2007 | Wu | 709/231 |

(Continued)

FOREIGN PATENT DOCUMENTS

WO     WO2007029116 A2     3/2007

Primary Examiner—Aaron Strange
Assistant Examiner—Margishi Desai
(74) Attorney, Agent, or Firm—Dillon & Yudell LLP (57) ABSTRACT

A method, system, and computer program product for assigning reply status to an outgoing electronic mail (e-mail) message. While creating an e-mail message, an interface is provided for granularly assigning or denying reply privileges to recipients of an outgoing e-mail message. Reply status is assigned by selecting a subset of recipients by name, e-mail address, and/or e-mail group who may reply to the e-mail. As the recipient's reply status is modified, the outgoing e-mail is updated, revising the reply e-mail address for each recipient. When the recipient is granted reply status, the e-mail address of the original sender is provided as the reply e-mail address. However, in the event the recipient is not granted reply status, the e-mail address of an automated, unmanned e-mail account is provided as the reply e-mail address.

18 Claims, 5 Drawing Sheets

U.S. PATENT DOCUMENTS

| | | | |
|---|---|---|---|
| 2007/0038711 A1* | 2/2007 | MacBeth et al. | 709/206 |
| 2007/0050488 A1* | 3/2007 | Joyner et al. | 709/223 |
| 2007/0061423 A1* | 3/2007 | Accapadi et al. | 709/219 |
| 2007/0124396 A1* | 5/2007 | Febonio et al. | 709/206 |
| 2007/0263791 A1* | 11/2007 | Alperin et al. | 379/67.1 |
| 2008/0010348 A1* | 1/2008 | Dawson et al. | 709/206 |
| 2008/0065728 A1* | 3/2008 | Haas | 709/206 |
| 2008/0084990 A1* | 4/2008 | Vincent et al. | 379/354 |
| 2008/0086530 A1* | 4/2008 | Gandhi et al. | 709/206 |
| 2008/0104177 A1* | 5/2008 | Keohane et al. | 709/206 |
| 2008/0155029 A1* | 6/2008 | Helbling et al. | 709/206 |
| 2008/0207233 A1* | 8/2008 | Waytena et al. | 455/466 |
| 2009/0012798 A1* | 1/2009 | McConnell et al. | 705/1 |
| 2009/0019116 A1* | 1/2009 | Niebuhr | 709/206 |
| 2009/0037541 A1* | 2/2009 | Wilson | 709/206 |

* cited by examiner

GRANULARLY SELECTING A SUBSET OF RECIPIENTS WHO CAN REPLY TO A SENDER'S E-MAIL

BACKGROUND

1. Technical Field

The present invention generally relates to an electronic mail (e-mail) system and in particular to manipulating e-mail. Still more particularly, the present invention relates to a method for manipulating outgoing e-mail.

2. Description of the Related Art

Electronic mail (e-mail) is extensively utilized as a professional, educational, and personal mode of communication. E-mail is a method of composing, sending, and/or receiving messages over an electronic communication system. E-mail messages may be sent over the Internet or within an intranet system which allows users within the network of an organization to e-mail each other. An e-mail may be sent to a single recipient, or multiple recipients, simultaneously.

Several problems exist with sending a single e-mail to multiple recipients. When e-mail is sent to a large set of people or "mass e-mailing," additional text may be inserted into the body of the e-mail stating the e-mail has been sent by an automated agent. Typically, in such cases the reply e-mail address is an account that directs messages to a trash bin. However, in some cases, receiving a reply from one or more of the recipients may be advantageous.

Also, when sending an e-mail to multiple recipients utilizing a valid reply address, the send may not desire an influx of reply e-mails. An influx of responding e-mails may cause a violation of e-mail storage space. Violating e-mail storage constraints may cause temporary suspension of the e-mail account, thereby, preventing the delivery of incoming e-mail messages. Failure for a chief operating official to receive one extremely important e-mail could be detrimental to an entire agency.

Although suspension of an e-mail account due to a mass influx of e-mails is not desired, there are times when a reply is warranted from some recipients in the mass mailing, but not all. For example, a mass e-mail may be distributed to an entire company, for the information of all employees. However, the original sender of the e-mail may only desire the response of managers and supervisors. In this situation a reply from all employees is not warranted.

SUMMARY OF THE ILLUSTRATIVE EMBODIMENTS

Disclosed is a method for assigning reply status to an outgoing electronic mail (e-mail) message. While creating an e-mail message, an interface is provided for granularly assigning or denying reply privileges to recipients of an outgoing e-mail message. Reply status is assigned by selecting a subset of recipients by name, e-mail address, and/or e-mail group who may reply to the e-mail. As the recipient's reply status is modified, the outgoing e-mail is updated, revising the reply e-mail address for each recipient. When the recipient is granted reply status, the e-mail address of the original sender is provided as the reply e-mail address. However, in the event the recipient is not granted reply status, the e-mail address of an automated, unmanned e-mail account is provided as the reply e-mail address.

In one embodiment, the invention provides a method for granularly assigning reply privilege to each recipient of an outgoing e-mail. Utilizing a mail user agent (MUA) such as Eudora™, IBM Lotus Notes™, Microsoft Outlook™, or Outlook Express™, a client creates a single e-mail message addressed to multiple recipients. The creator, or client, of an outgoing e-mail message enters the recipient e-mail addresses into the "To" field of the outgoing message. When a request is made to assign reply privileges to particular recipients, a graphical user interface (GUI) is displayed. The GUI identifies each recipient via the name and/or e-mail address of the recipient, and allows the e-mail creator to assign reply status by group, e-mail address, or name. As the reply assignments are updated on the GUI, the reply fields of the outgoing e-mail are automatically modified.

In another embodiment, the invention provides a method for automatically inputting a message within the body of an e-mail displaying reply instruction. After a client updates the GUI with recipient reply status, instructions are displayed in the body of the e-mail message requesting the recipient to "reply" or "do not reply." Messages permitting a reply have replies directed to the e-mail address of the original sender. Messages that do not permit a reply are directed to an automated, unmanned e-mail account, in lieu of the reply e-mail address of the original sender.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system and computer program product for assigning reply status to an outgoing electronic mail (e-mail) message. While creating an e-mail message, an interface is utilized is provided for granularly assigning or denying reply privileges to recipients of an outgoing e-mail message. Reply status is assigned by selecting a subset of recipients by name, e-mail address, and/or e-mail group who may reply to the e-mail. As the recipient's reply status is modified, the outgoing e-mail is updated, revising the reply e-mail address for each recipient. When the recipient is granted reply status, the e-mail address of the original sender is provided as the reply e-mail address. However, in the event the recipient is not granted reply status, the e-mail address of an automated, unmanned e-mail account is provided as the reply e-mail address.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
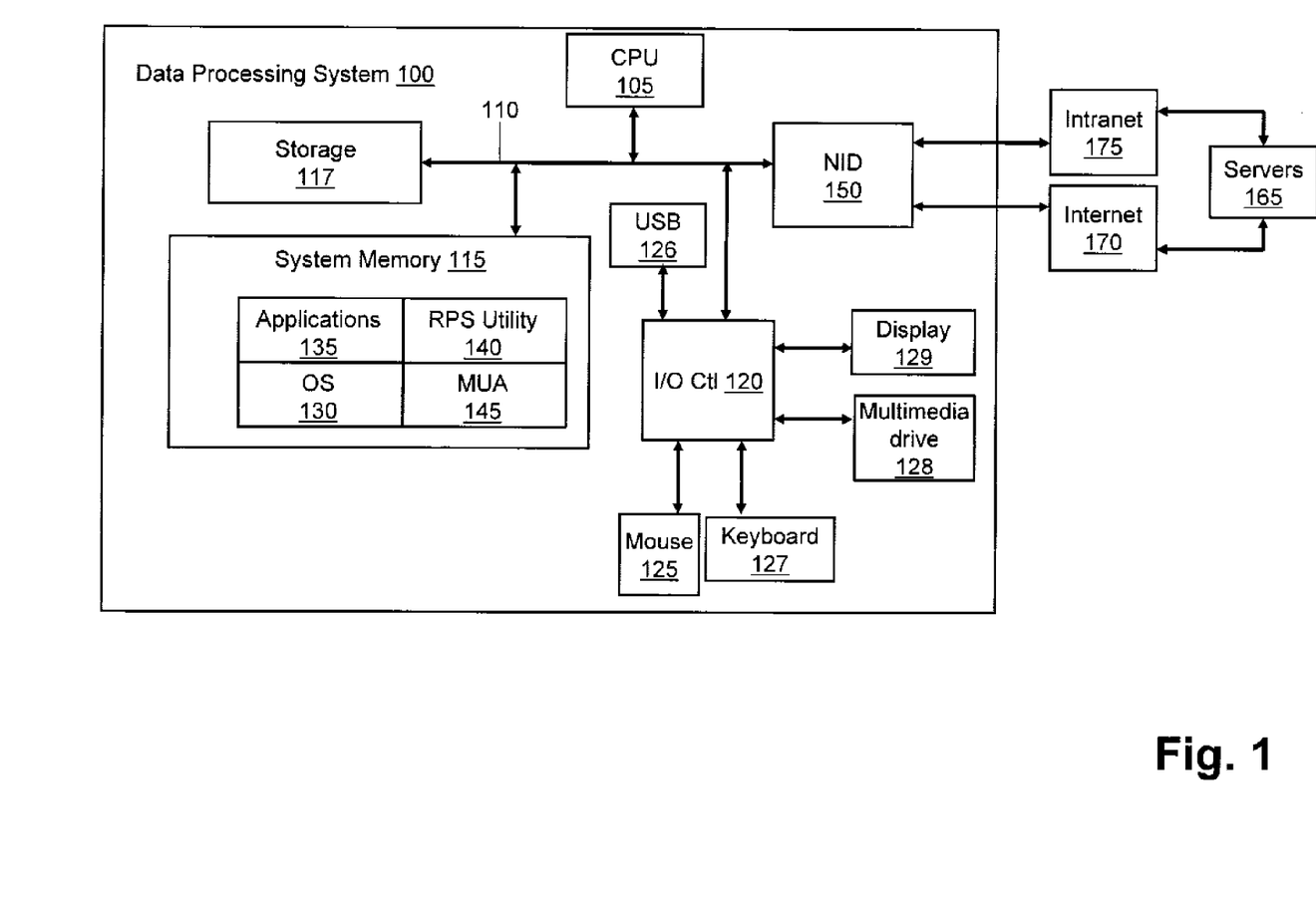
FIG. 1 is a diagram of an example data processing system according to one embodiment of the invention.

With reference now to the figures, FIG. 1, there is depicted a block diagram representation of a data processing system (and connected network). DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) hub 126 are illustrated, coupled to I/O controller 120. Multimedia drive 128 and USB hub 126 may operate as both input and output (storage) mechanisms. DPS 100 also comprises storage 117, within which data/instructions/code may be stored.

DPS 100 is also illustrated with a network interface device (NID) 150, with which DPS 100 connects to one or more servers 165 via an access network, such as the Internet 170 or Intranet 175. In the described embodiments, Internet 170 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within system memory 115 or other storage (e.g., storage 117) and executed by CPU 105. Thus, illustrated within system memory 115 are a number of software/firmware components, including operating system (OS) 130 (e.g., Microsoft Windows®, a trademark of Microsoft Corp, or GNU®/Linux®, registered trademarks of the Free Software Foundation and The Linux Mark Institute), applications 135, mail user agent (MUA) 145, such as Eudora™, IBM Lotus Notes™, Microsoft Outlook™, or Outlook Express™, and recipient reply selection (RRS) utility 140. In actual implementation, applications 135, MUA 140, and RRS utility 140 may be combined as a single application collectively providing the various functions of each individual software component when the corresponding code is executed by CPU 105. For simplicity, RRS utility 140 is illustrated and described as a downloadable enhancement to MUA 140 or software modification which provides specific functions, as described below.

CPU 105 executes RRS utility 140, MUA 145, and OS 130, which supports the user interface features of RRS utility 140 and MUA 145. In the illustrative embodiment, RRS utility 140 provides several graphical user interfaces (GUIs) to enable user interaction with, or manipulation of, the functional features of the utility (140). Among the software code/instructions provided by RRS utility 140, and which are specific to the invention, are: (a) code for displaying a graphical user interface for assigning reply status to outgoing e-mail; (b) code for assigning reply status to an e-mail; and (c) code for assigning or denying privilege to reply to an e-mail for a subset of recipients. For simplicity of the description, the collective body of code that enables these various features is referred to herein as RRS utility 140. According to the illustrative embodiment, when CPU 110 executes RRS utility 140, DPS 100 initiates a series of functional processes that enable the above functional features as well as additional functionalities, which are described below within the description of FIGS. 2-4.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
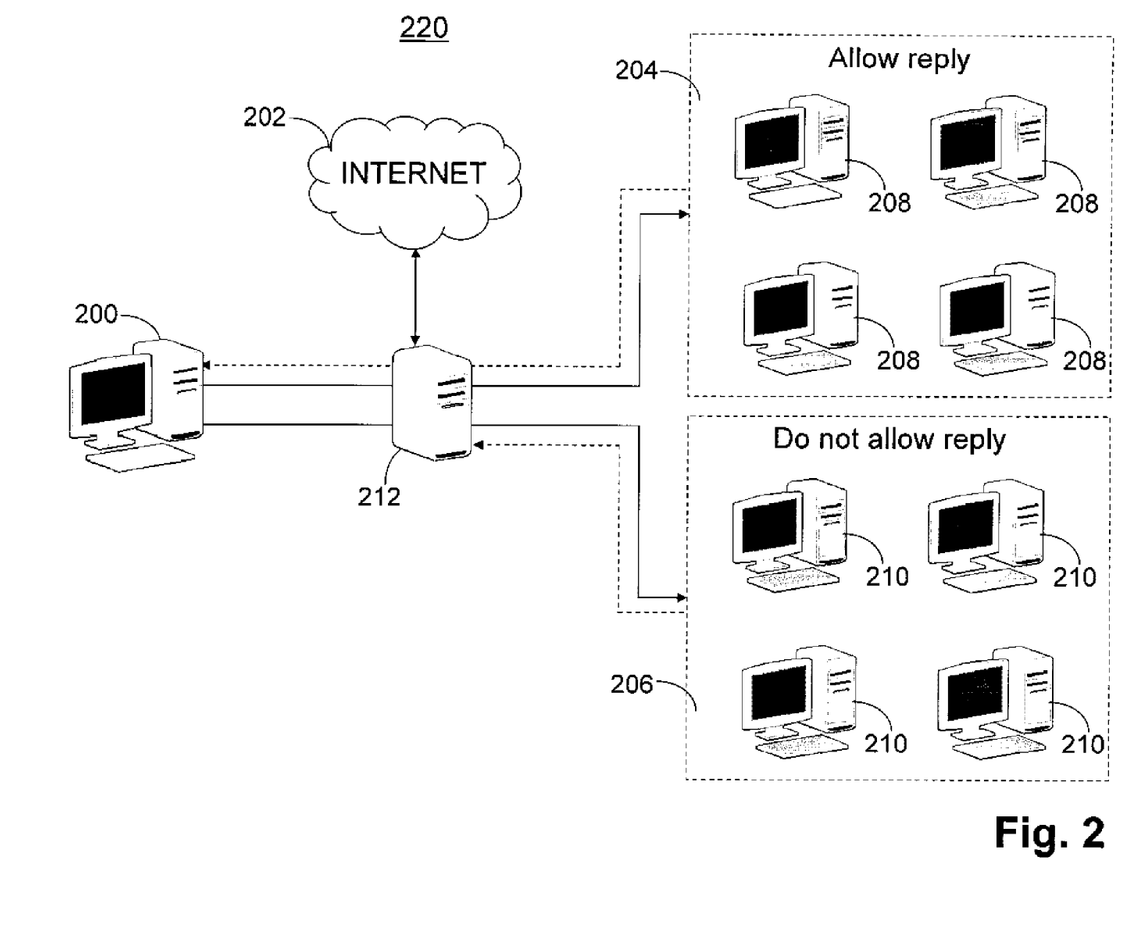
FIG. 2 is a diagram of a network of computers with mail user agents, linked to the internet in accordance with one embodiment of the invention.

With reference now to FIG. 2, network 220 comprises computer systems 200, 208, and 210, which are connected to MUA server 212 through Internet 202. Within network 220 are two sets of recipients. Recipient subset X 204 represents the subset of recipients that are allowed to reply and recipient subset Y 206 represent the subset of recipients that are not allowed to reply to the e-mail sent by the MUA client computer system 200. Unwanted e-mail bin 212 receives all unwarranted reply e-mail. Computer systems 200, 208, and 210 may be configured similar to data processing system 100 of FIG. 1. In one embodiment of the invention a client (e.g. MUA on computer system 200) creates a single e-mail message addressed to multiple recipients. The e-mail message is created on client the MUA of computer system 200 and sent through server 212, via Internet 202, to recipient subset X 204 and recipient subset Y 206. Recipient subset X 204 consists of recipient computer systems 208 manned by e-mail recipients who have been authorized to reply to the e-mail sent from client computer system 200. Recipient subset Y 206 consists of recipient computer systems 210 manned by e-mail recipients who have not been authorized to reply to the e-mail sent by client computer system 200.

In one embodiment, when a reply e-mail is sent from recipient computer systems 208 of recipient subset X 204, the e-mail is returned to the e-mail address of the original sender, represented by client computer system 200. Recipient computer systems 210 of recipient subset Y 206 are not authorized to reply to the e-mail sent by client computer system 200. Reply e-mails from recipient subset Y 206 are unwarranted, therefore all reply e-mails from recipient computer systems 210 are sent to an automated, unmanned e-mail address, or "unwanted e-mail bin" on MUA server 212 via Internet 202.

In one embodiment of the invention, reply e-mails from recipient subset Y 206 may be sent to a secondary e-mail address, forwarded to a junk e-mail account or folder of the sender's MUA, or sent to an alternate folder. A secondary e-mail address may be less frequented, but provided to store the reply e-mails of recipient subset Y 206. In one implementation, reply e-mails from recipient subset Y 206 may be forwarded to a junk e-mail account or alternate folder by checking the "sent from" address within the reply e-mail to determine whether the reply e-mail originated from one of recipient subset X 204 or recipient subset Y 206. When the "sent from" address is one of recipient subset X 204, the e-mail is forwarded to an inbox of the sender, i.e., the MUA on client computer system 200. When the e-mail was sent from one of recipient subset Y 206, the e-mail is forwarded to the junk mail account or an alternate folder.

While illustrated as computer systems, portable devices, e.g. PDAs, cellular phones, Blackberry™, and other devices capable of providing/executing an MUA for sending and receiving e-mails may be utilized in place of computer systems 200, 208, and 210.

Figure 3:
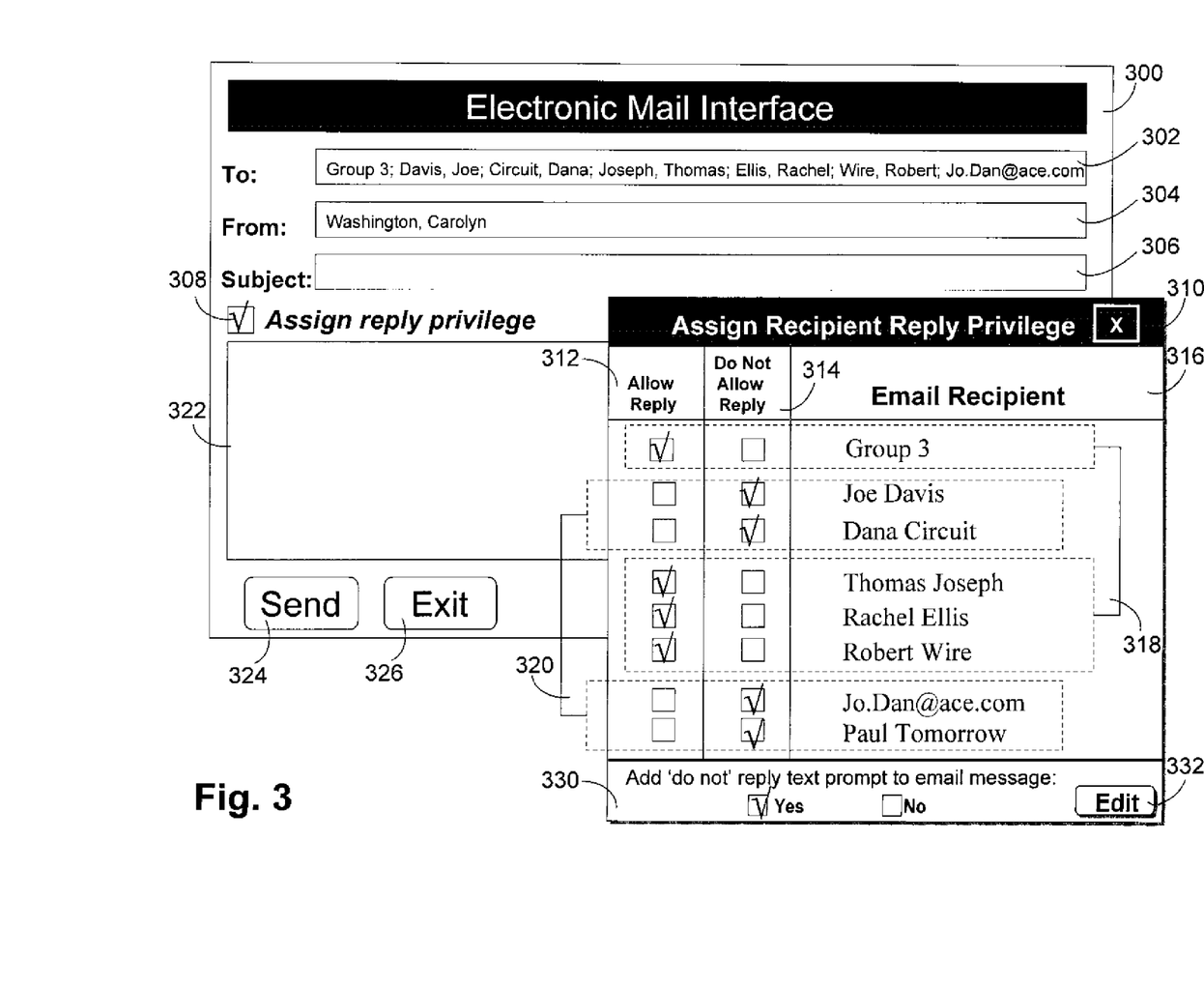
FIG. 3 illustrates a graphical user interface for creating e-mail messages and granularly assigning e-mail reply privilege according to one embodiment of the invention.

Prior to sending the e-mail message, recipient subset X 204 and recipient subset Y 206 are selected utilizing a recipient's name, e-mail address, or group title from a graphical user interface within the MUA. FIG. 3 illustrates an example graphical user interface for creating e-mail messages, and an associated recipient selection GUI utilized to select a subset of recipients to have e-mail reply privileges.

In FIG. 3, e-mail interface 300 comprises the following information fields: recipient (To) field 302, sender (From) field 304, subject field 306 and text field 322. Reply privilege GUI 310 is displayed when assign reply privilege 308 is selected. From reply privilege GUI 310, a client may select the subset of recipients who may reply to the outgoing e-mail, as well as identify the subset of recipients who are not allowed to reply. Reply privilege GUI 310 comprises allow reply 312, do not allow reply 314, and e-mail recipient identity 316.

Displayed in reply privilege GUI 310 are e-mail recipient identities in the form of a names, e-mail address, or group assignment. Allow reply 318 and do not allow reply 320 identify a subset of recipients selected to reply to the outgoing e-mail, and a subset of recipients not allowed to reply. Reply instructions may be automatically added to the body of the e-mail utilizing add message 330 or instructions may be modified utilizing edit 332. Following assignment of reply privilege and upon completion of the e-mail message, the e-mail may be sent by selecting send 324 or the client may leave the MUA interface utilizing exit 326.

In one embodiment of the invention, e-mail recipients are entered in recipient (To) field 302 within e-mail interface 300. After selecting reply privilege 308, reply privilege GUI 310 is displayed. E-mail recipient identity 316 is updated according to the entries of recipient field 302. Recipient reply privilege is assigned by selecting the respective boxes of allow reply 312 and do not allow reply 314. In an example embodiment, allow reply 318 identifies the subset of recipients authorized to reply to the outgoing e-mail message, and do not allow reply 320 identifies the subset of recipients that are not authorized to reply to the outgoing e-mail.

As reply privilege GUI 310 is modified, the reply e-mail address is updated in the outgoing e-mail. E-mail recipients in allow reply 318 are automatically assigned the reply e-mail address of client field 304. E-mail recipients in do not allow reply 320 are assigned the e-mail address of an automated, perhaps unmanned e-mail account. E-mail recipients not selected in allow reply 318 or do not allow reply 320 are assigned the default address of client field 304. The default address may be the sender's address, where selection of "do not reply" is required to forced reply email into another location other than the sender's inbox. In another embodiment, such as where the MUAs is utilized to send out a large amount of spam mail or group mail, the default address may be the address of a separate email account or a directed address link to the junk mailbox of the sender's address. Following all updates to reply privilege GUI 310 and after completion of e-mail message, the e-mail may be sent utilizing send 324 or the client may leave the MUA interface utilizing exit 326.

In one embodiment, the invention provides a method for automatically inputting a message within text field 322 displaying reply instructions for recipients not authorized to reply. A text message prompting recipients not to reply may be added by selecting the "yes" box of add message 330. If the "do not reply" message is not required in the e-mail, the "no" box may be selected. The text of add message 330 may also be changed utilizing edit 332. The text of add message 330 may be modified to direct replies to a particular e-mail address via edit 332.

Figure 4:
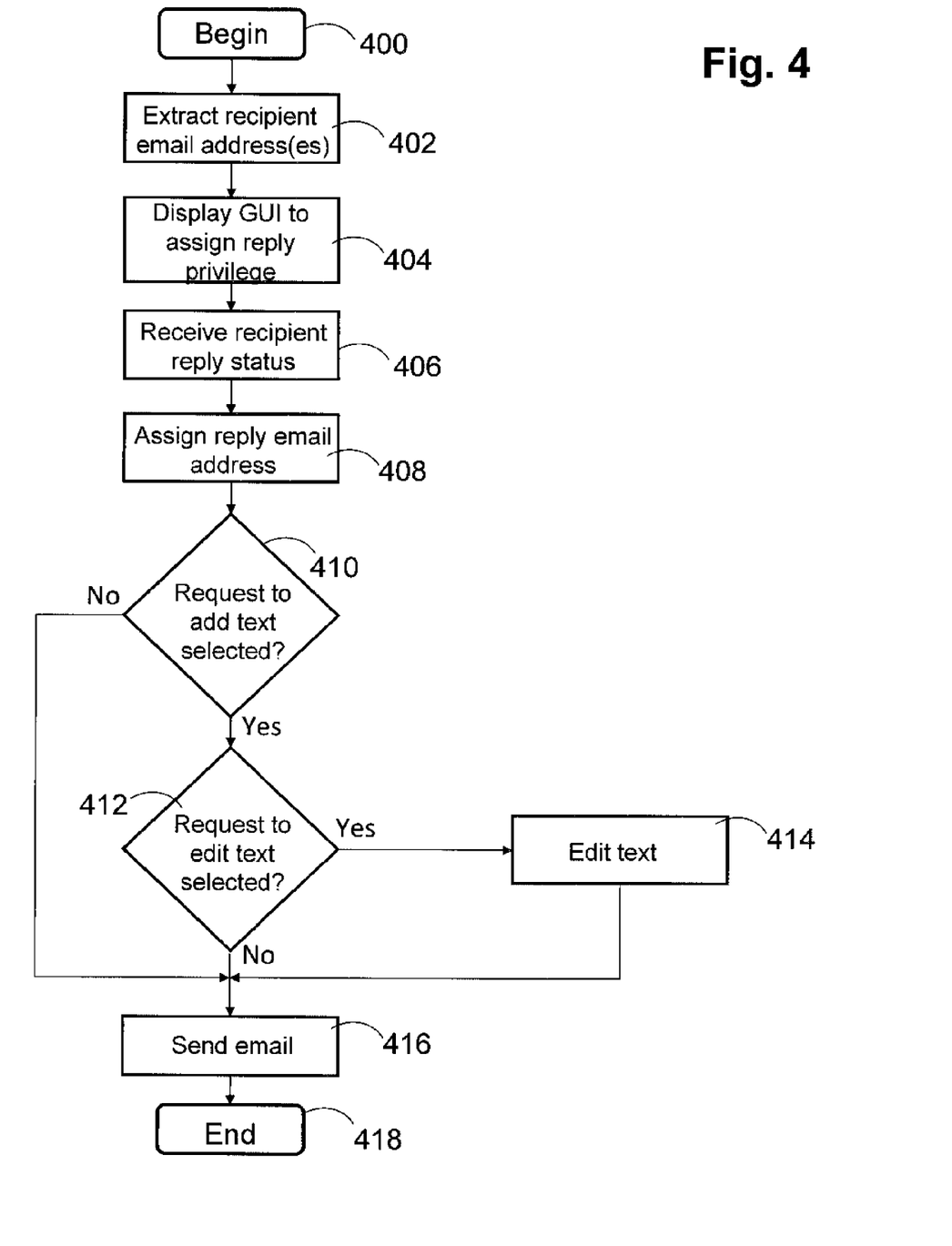
FIG. 4 is a logic flow chart illustrating the method for implementation of the recipient selection prior to sending the e-mail according to one embodiment of the invention.

FIG. 4 is a flow chart illustrating various methods by which the above processes of the illustrative embodiments are completed. Although the methods illustrated in FIG. 4 may be described with reference to components shown in FIGS. 1-3, it should be understood that this is merely for convenience and alternative components and/or configurations thereof can be employed when implementing the various methods. Key portions of the methods may be completed by RRS utility 140 executing within DPS 100 (FIG. 1) and controlling specific operations on DPS 100, and the methods are thus described from the perspective of both RRS utility 140 and DPS 100.

The process illustrated by FIG. 4 begins at initiator block 400. At block 400 RRS utility is initiated when reply privilege 308, of FIG. 3 is selected. The RRS utility extracts the e-mail address of each recipient, at block 402, and may display the e-mail address, name, or group name identifying the recipient. After the recipient identities have been extracted by the RRS utility, reply privilege GUI 310 is opened, at step 404. At step 406, the recipient reply status is accepted by the RRS utility. At step 408, the utility modifies the recipient's reply status and automatically assigns a reply e-mail address to each individual e-mail, according to whether allow reply 312 or do not allow reply 314 was selected for the e-mail. At step 410, the MUA sends the e-mail via Internet 202, as illustrated in FIG. 2.

In one embodiment of the invention, a first reply status is automatically assigned to an e-mail being transmitted to one or more first e-mail recipients. The first reply status indicates that the first e-mail recipients are authorized to reply to the e-mail, and enables the reply e-mail to be returned to a primary location, corresponding to the e-mail address from which the e-mail is being transmitted (i.e., sender's e-mail). A second reply status is assigned to the e-mail being sent to second e-mail recipients, who are not among the one or more first e-mail recipients. The second reply status indicates that the second recipients are not authorized to send a reply e-mail, and the reply e-mails from the second recipients are dynamically routed to a secondary location.

In one embodiment selecting recipients comprises detecting a first selection of the one or more first e-mail recipients received by the GUI, and detecting a second selection of the first reply status. First e-mail recipients have the primary location, or sender's e-mail address, automatically associated as the reply address to the e-mail for copies of the e-mail transmitted to the first e-mail recipients. Second e-mail recipients or those not authorized to reply to the sender's e-mail, have e-mail replies automatically linked to a secondary location.

Figure 5:
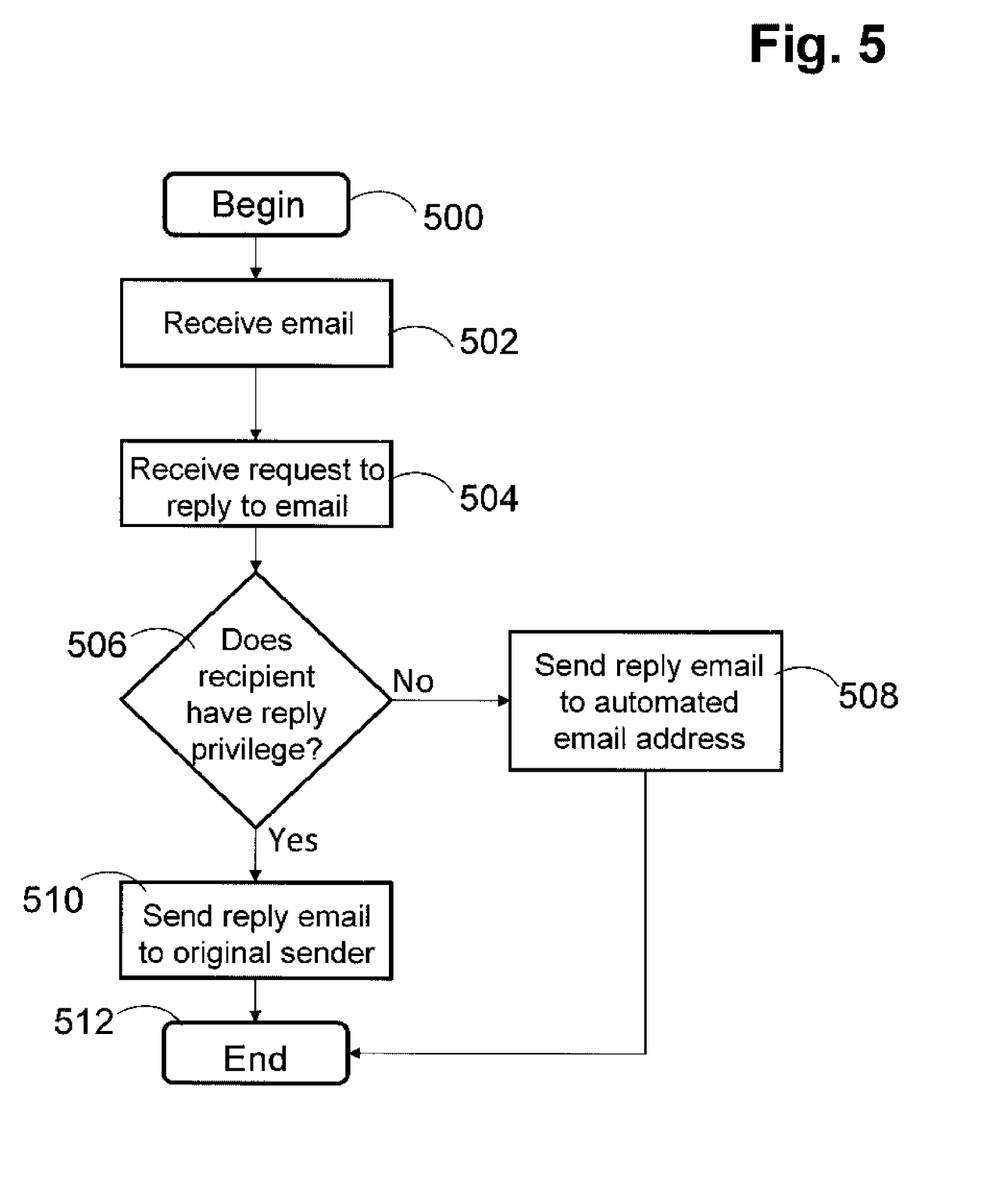
FIG. 5 is a logic flow chart illustrating the process of the mail user agent after the e-mail has been received by the recipient according to one embodiment of the invention.

The MUA splits the e-mail transmission so that a first e-mail with a first reply (sender) e-mail address is sent to a first set of recipients, and a second e-mail with a second reply (automated) e-mail address is sent to a second set of recipients. FIG. 5 illustrates the recipient side of the reply process, beginning at block 500. At block 500, the MUA utility is initiated. The MUA receives an e-mail at block 502. At block 504, a request is received to reply to the e-mail message. A determination is made at step 506 whether the recipient has reply privileges, which may be indicated by analyzing a reply status embedded in the received email. If the recipient was not selected as one of the subset of recipients with authorization to reply to the e-mail's sender, the assigned reply e-mail address will direct the e-mail to an automated e-mail address at step 508. If the recipient was selected to reply to the email's sender, the e-mail is sent to the original sender, at step 510. The process ends at step 512.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing device, a method comprising:
a processor executing a utility to perform the functions of:
automatically assigning a first reply status to an e-mail being transmitted to one or more first e-mail recipients, said first reply status allowing a reply e-mail from the one or more first e-mail recipients to be returned to a primary location corresponding to an e-mail address from which the e-mail is being transmitted;
associating a second reply status to the e-mail transmitted to second e-mail recipients that are not among the one or more first e-mail recipients, wherein the second e-mail recipients are not granted reply status, said second reply status causing a reply to the e-mail from the second e-mail recipients to be dynamically routed to a secondary location that is different from the primary location, wherein the secondary location is an automated, unnamed e-mail account;
receiving a reply e-mail to the e-mail;
checking the "sent from" address within the reply e-mail to determine whether the reply e-mail originated from one of the primary or secondary e-mail recipients; and
when the sent from address is one of the primary e-mail recipients, forwarding the reply e-mail to an inbox of the mail user agent (MUA); and
when the sent from address is one of the secondary e-mail recipients, forwarding the reply e-mail to the secondary location;
wherein reply privilege to the inbox of the MUA is denied to reply e-mail originating from the secondary e-mail recipients for whom reply privilege has not been assigned.

2. The method of claim 1, further comprising:
detecting a first selection of the second e-mail recipients;
detecting a second selection of the second reply status; and
linking the secondary location as a reply address for copies of the e-mail transmitted to the second e-mail recipients;
wherein the primary location is automatically assigned as the reply address to the e-mail, and copies of the e-mail to be transmitted to the second e-mail recipients are subsequently re-assigned the secondary location.

3. The method of claim 2, wherein:
the primary location is the inbox of the e-mail address; and
the automated, unnamed email account is the junk mailbox of the e-mail address.

4. The method of claim 3, further comprising:
receiving a reply e-mail to the e-mail;
checking the reply address within the reply e-mail;

when the reply address is the primary location, forwarding the reply e-mail to an inbox of the mail user agent; and when the reply address is the secondary location, forwarding the reply e-mail to the secondary location.

5. The method of claim 2, wherein the automated, unnamed e-mail account is a separate e-mail address from the e-mail address from which the e-mail is transmitted.

6. The method of claim 1 further comprising:

displaying an interface for receiving an assignment of a reply status for-e-mail recipients;

receiving one or more selections from among allowing or denying a privilege by one or more e-mail recipients to reply to an e-mail using the primary location as a reply address;

dynamically linking one of the first location and the second location as a reply e-mail address for an e-mail recipient, based on an assigned reply status for the e-mail recipient.

selectively embedding an assigned reply address to copies of the e-mail transmitted, according to the assigned reply status;

transmitting each copy of the e-mail to respective e-mail recipients, said copy being embedded with the assigned reply address according to the assigned reply status;

wherein an e-mail reply generated by one of the first e-mail recipients is delivered back to an inbox of the mail user engine from which the e-mail originated; and wherein e-mail replies generated by one of the second e-mail recipients are sent to the secondary location.

7. The method of claim 6, wherein said assigning reply status further comprises:

outputting one or more of the name, e-mail address, or name and e-mail address of one or more recipients to the interface along with a selection icon that enables selection of a reply status from among (a) allow e-mail reply to the primary location and (b) do not allow reply to the primary location;

prompting for selection of a reply status, where the selection is one of: (a) allow or (b) do not allow;

receiving a selection to identify the reply status of the recipient of the outgoing e-mail; and assigning the reply status according to the name and/or e-mail address of a recipient.

8. The method of claim 6, further comprising:

linking a status content message to general content of the e-mail, based on the reply status of the recipient of the copy of the e-mail, said message including instructions indicating whether permission is granted to reply to the e-mail, and when permission is not granted, said instructions including "do not reply" instructions for e-mail recipients not assigned a reply privilege; and transmitting the status content message for publishing along with general e-mail content of the transmitted copy of the e-mail that is provided to the e-mail recipient that is assigned the particular reply status.

9. A computer program product comprising:

a computer readable storage medium; and program code on the computer readable storage medium that when executed by a processor provides the functions of:

automatically assigning a first reply status to an e-mail being transmitted to one or more first e-mail recipients, said first reply status allowing a reply e-mail from the one or more e-mail recipients to be returned to a primary location corresponding to an e-mail address from which the e-mail is being transmitted;

associating a second reply status to the e-mail transmitted to second e-mail recipients that are not among the one or more first e-mail recipients, wherein the second e-mail recipients are not granted reply status, said second reply status causing a reply to the e-mail from the second e-mail recipients to be dynamically routed to a secondary location that is different from the primary location, wherein the secondary location is an automated, unnamed e-mail account;

receiving a reply e-mail to the e-mail;

checking the "sent from" address within the reply e-mail to determine whether the reply e-mail originated from one of the primary or secondary e-mail recipients; and when the sent from address is one of the primary e-mail recipients, forwarding the reply e-mail to an inbox of the mail user agent (MUA); and when the sent from address is one of the secondary e-mail recipients, forwarding the reply e-mail to the secondary location;

wherein reply privilege to the inbox of the MUA is denied to reply e-mail originating from the secondary e-mail recipients for whom reply privilege has not been assigned.

10. The computer program product of claim 9, wherein the program code for associating further comprises code for:

detecting a first selection of the second e-mail recipients;

detecting a second selection of the second reply status; and linking the secondary location as a reply address for copies of the e-mail transmitted to the second e-mail recipients;

wherein the primary location is automatically assigned as the reply address to the e-mail, and copies of the e-mail to be transmitted to the second e-mail recipients are subsequently re-assigned the secondary location.

11. The computer product code of claim 10, wherein:

the primary location is the inbox of the e-mail address; and the automated, unnamed e-mail account is the junk mailbox of the e-mail address.

12. The computer program product of claim 11, further comprising code for:

receiving a reply e-mail to the e-mail;

checking the reply address within the reply e-mail;

when the reply address is the primary location, forwarding the reply e-mail to an inbox of the mail user agent; and when the reply address is the secondary location, forwarding the reply e-mail to the secondary location.

13. The computer program product of claim 10, wherein the program code for determining the secondary location includes code for assigning a separate e-mail address from the e-mail address from which the e-mail is transmitted.

14. The computer program product of claim 9, wherein the program code further comprises code for:

displaying an interface for receiving an assignment of a reply status for-e-mail recipients;

receiving one or more selections from among allowing or denying a privilege by one or more e-mail recipients to reply to an e-mail using the primary location as a reply address;

dynamically linking one of the first location and the second location as a reply e-mail address for an e-mail recipient, based on an assigned reply status for the e-mail recipient;

selectively embedding an assigned reply address to copies of the e-mail transmitted, according to the assigned reply status;

transmitting each copy of the e-mail to respective e-mail recipients, said copy being embedded with the assigned reply address according to the assigned reply status;

wherein an e-mail reply generated by one of the first e-mail recipients is delivered back to an inbox of the mail user engine from which the e-mail originated; and wherein e-mail replies generated by one of the second e-mail recipients are sent to the secondary location.

15. The computer program product of claim 14, wherein the code for assigning reply status further comprises code for:

outputting one or more of the name, e-mail address, or name and e-mail address of one or more recipients to the interface along with a selection icon that enables selection of a reply status from among (a) allow e-mail reply to the primary location and (b) do not allow reply to the primary location;

prompting for selection of a reply status, where the selection is one of: (a) allow or (b) do not allow;

receiving a selection to identify the reply status of the recipient of the outgoing e-mail; and assigning the reply status according to the name and/or e-mail address of a recipient.

16. The computer product of claim 14, further comprising code for:

linking a status content message to general content of the e-mail, based on the reply status of the recipient of the copy of the e-mail, said message including instructions indicating whether permission is granted to reply to the e-mail, and when permission is not granted, said instructions including "do not reply" instructions for e-mail recipients not assigned a reply privilege; and transmitting the status content message for publishing along with general e-mail content of the transmitted copy of the e-mail that is provided to the e-mail recipient that is assigned the particular reply status.

17. An electronic device comprising:

a processor component;

an input/output (I/O) mechanism that enables entry of e-mail reply status;

a mechanism for transmitting and receiving e-mails and reply e-mails from and to a mail user agent (MUA) executing on the device; and a utility executing on the processor component and which comprises codes that enables completion of the functions of:

automatically assigning a first reply status to an e-mail being transmitted to one or more first e-mail recipients, said first reply status allowing a reply e-mail from the one or more e-mail recipients to be returned to a primary location corresponding to an e-mail address from which the e-mail is being transmitted; and associating a second reply status to the e-mail transmitted to second e-mail recipients that are not among the one or more first e-mail recipients, wherein the second e-mail recipients are not granted reply status, said second reply status causing a reply to the e-mail from the second e-mail recipients to be dynamically routed to a secondary location that is different from the primary location, wherein the secondary location is an automated, unnamed e-mail account, wherein said associating includes:

detecting a first selection of the second e-mail recipients;

detecting a second selection of the second reply status; and linking the secondary location as the reply address for copies of the e-mail transmitted to the second e-mail recipients;

wherein the primary location is automatically assigned as the reply address to the e-mail, and copies of the e-mail to be transmitted to the second e-mail recipients are subsequently re-assigned the secondary location;

wherein when the primary location is the inbox of the e-mail address and the secondary location is the junk mailbox of the e-mail address;

receiving a reply e-mail to the e-mail; and performing one of a sequence of processes from among:

(1) checking the reply address within the reply e-mail; when the reply address is the primary location, forwarding the reply e-mail to an inbox of the mail user agent; and when the reply address is the secondary location, forwarding the reply e-mail to the secondary location; and (2) checking the "sent from" address within the reply e-mail to determine whether the reply e-mail originated from one of the primary or secondary e-mail recipients; when the sent from address is one of the primary e-mail recipients, forwarding the reply e-mail to an inbox of the mail user agent (MUA); and when the sent from address is one of the secondary e-mail recipients, forwarding the reply e-mail to the secondary location; wherein reply privilege to the inbox of the MUA is denied to reply e-mail originating from the secondary e-mail recipients for whom reply privilege has not been assigned.

18. The electronic device of claim 17, wherein said program code comprises code for:

outputting one or more of the name, e-mail address, or name and e-mail address of one or more recipients to the interface along with a selection icon that enables selection of a reply status from among (a) allow e-mail reply to the primary location and (b) do not allow reply to the primary location;

prompting for selection of a reply status, where the selection is one of: (a) allow or (b) do not allow status;

receiving a selection to identify the reply status of the outgoing e-mail;

assigning reply status according to the name and/or e-mail address of a recipient;

linking a status message to general content of the e-mail, based on the reply status of the recipient of the copy of the e-mail, said status message including instructions indicating whether permission is granted to reply to the e-mail, said when permission is not granted, said instructions including "do not reply" instructions for e-mail recipients not assigned a reply privilege; and transmitting the status message for publishing along with general e-mail content of the transmitted copy of the e-mail provided to the e-mail recipient that is assigned the particular reply status.

* * * * *